United States Patent
Goto et al.

(10) Patent No.: US 10,195,935 B2
(45) Date of Patent: Feb. 5, 2019

(54) FILLER PIPE

(71) Applicant: TOYOTA JIDOSHA KABUSHIKI KAISHA, Toyota-shi (JP)

(72) Inventors: Yoshifumi Goto, Toyota (JP); Satoshi Haraguchi, Toyota (JP); Shinji Shimokawa, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 481 days.

(21) Appl. No.: 14/850,320

(22) Filed: Sep. 10, 2015

(65) Prior Publication Data
US 2016/0075230 A1    Mar. 17, 2016

(30) Foreign Application Priority Data

Sep. 12, 2014  (JP) .................................. 2014-185877

(51) Int. Cl.
*B60K 15/00* (2006.01)
*B60K 15/04* (2006.01)

(52) U.S. Cl.
CPC ........ *B60K 15/04* (2013.01); *B60K 2015/047* (2013.01); *B60K 2015/0477* (2013.01)

(58) Field of Classification Search
CPC .............. B60K 15/04; B60K 2015/047; B60K 2015/0477
USPC ......................................... 220/56.2; 141/346
See application file for complete search history.

(56) References Cited

U.S. PATENT DOCUMENTS

| | | | | | |
|---|---|---|---|---|---|
| 3,478,922 | A * | 11/1969 | Mole | ...................... | B60K 15/04 220/229 |
| 4,651,889 | A * | 3/1987 | Uranishi | ................ | B60K 15/04 123/519 |
| 5,839,489 | A * | 11/1998 | Ganachaud | ............ | B60K 15/04 141/301 |
| 5,860,460 | A * | 1/1999 | Hidano | .................. | B60K 15/04 141/286 |
| 7,997,306 | B2 * | 8/2011 | Kobayashi | ............. | B60K 15/04 141/286 |
| 8,087,435 | B2 * | 1/2012 | Dennis | ................... | B60K 15/04 141/290 |

(Continued)

FOREIGN PATENT DOCUMENTS

| | | |
|---|---|---|
| JP | 55-53619 U | 4/1980 |
| JP | 2009-18755 | 1/2009 |

(Continued)

*Primary Examiner* — Ernesto Grano
(74) *Attorney, Agent, or Firm* — Oblon, McClelland, Maier & Neustadt, L.L.P.

(57) ABSTRACT

A filler pipe includes a nozzle guide that is mounted on an inlet part of the filler pipe and holds a nozzle end part of a fueling gun. The nozzle guide includes a nozzle guide mounting part, which is mounted on the inlet part of the filler pipe, a nozzle guide holding part, which is positioned in a distal end of the nozzle guide, and holds the nozzle end part of the fueling gun, and a nozzle guide connecting part that connects the nozzle guide mounting part and the nozzle guide holding part with each other. The nozzle guide holding part has a plurality of projecting parts that are able to abut on an outer surface of a nozzle of the fueling gun. The nozzle guide is mounted on the inlet part of the filler pipe, at the nozzle guide mounting part, by swaging or spot welding.

7 Claims, 8 Drawing Sheets

(56) References Cited

U.S. PATENT DOCUMENTS

| | | | | |
|---|---|---|---|---|
| 8,220,508 B2* | 7/2012 | Rongstock | ............ | B60K 15/04 141/285 |
| 8,820,562 B2* | 9/2014 | Kito | ............ | B29C 45/1657 220/304 |
| 9,649,930 B2* | 5/2017 | Kato | ............ | B60K 15/04 |
| 9,731,596 B1* | 8/2017 | Labbe | ............ | B60K 15/0406 |
| 2008/0295906 A1* | 12/2008 | McCracken | ............ | B60K 15/04 137/592 |
| 2009/0014091 A1* | 1/2009 | Kobayashi | ............ | B60K 15/04 141/286 |
| 2010/0101683 A1* | 4/2010 | Dennis | ............ | B60K 15/04 141/363 |
| 2010/0212780 A1 | 8/2010 | Sato et al. | | |
| 2013/0206758 A1* | 8/2013 | Miyagawa | ............ | B23K 1/0008 220/86.2 |
| 2013/0306665 A1* | 11/2013 | Eberhardt | ............ | B60K 15/04 220/746 |
| 2014/0084005 A1* | 3/2014 | Kito | ............ | B29C 45/1657 220/304 |
| 2014/0312036 A1* | 10/2014 | Aubreville | ............ | B60K 15/04 220/86.2 |
| 2015/0251532 A1* | 9/2015 | Kato | ............ | B60K 15/04 220/86.2 |
| 2016/0272063 A1* | 9/2016 | Sekihara | ............ | B60K 15/04 |
| 2016/0272478 A1* | 9/2016 | Sekihara | ............ | B60K 15/04 |
| 2017/0015193 A1* | 1/2017 | Hendler | ............ | B60K 15/04 |
| 2017/0087981 A1* | 3/2017 | Sekihara | ............ | B60K 15/04 |

FOREIGN PATENT DOCUMENTS

| | | |
|---|---|---|
| JP | 2009-96215 A | 5/2009 |
| JP | 2009-208517 A | 9/2009 |
| JP | 2012-183887 A | 9/2012 |
| JP | 2014-80040 A | 5/2014 |
| JP | 2014-97693 | 5/2014 |

\* cited by examiner

FILLER PIPE

INCORPORATION BY REFERENCE

The disclosure of Japanese Patent Application No. 2014-185877 filed on Sep. 12, 2014 including the specification, drawings and abstract is incorporated herein by reference in its entirety.

BACKGROUND OF THE INVENTION

1. Field of the Invention

The invention relates to a filter pipe, in which a nozzle guide is mounted on an inlet part of the filter pipe that feeds fuel into an automobile fuel tank from an oil filler port.

2. Description of Related Art

Figure 6:
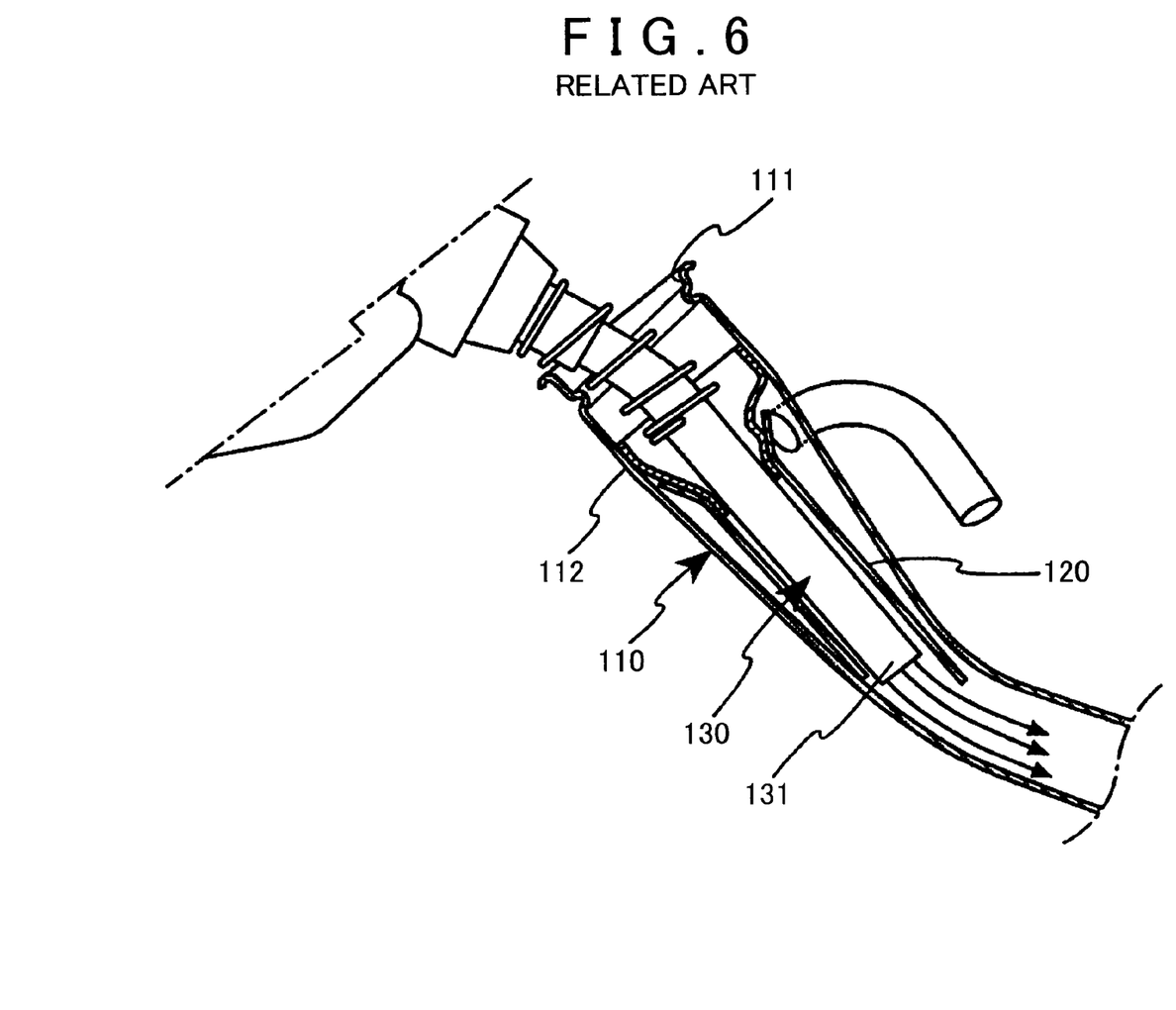
FIG. 6 is a sectional view of a part where a nozzle guide is mounted on an inlet part of a filler pipe according to a related art.

As shown in FIG. 6, a filler pipe 110 is mounted in order to feed fuel from an oil filler port of a vehicle body, which is provided in the vehicle body, to an automobile fuel tank. Fuel is fed into the filler pipe 110 by inserting a distal end part 131 of a fueling gun 130 into an inlet 111.

At this time, in order to hold the fueling gun 130 and also stabilize a flow of fuel, a nozzle guide 120 is provided inside an inlet part 112 of the filler pipe 110, and a distal end part of the nozzle guide 120 is formed into a pipe shape that extends long (for example, see Japanese Patent Application Publication No. 2009-18755 (JP 2009-18755 A)). In this case, the distal end part of the nozzle guide 120 holds the distal end part 131 of the fueling gun 130 so that the distal end part 131 of the fueling gun 130 always faces the same direction.

SUMMARY OF THE INVENTION

However, according to regulations in North America, the distal end part 131 of the fueling gun 130 needs to project from the nozzle guide 120 by 22.5 mm or more, thus making it impossible to use a long nozzle guide 120. Also, since a conventional nozzle guide 120 is made from synthetic resin, rigidity is not sufficient. Therefore, the nozzle guide 120 is bent when the distal end part 131 of the fueling gun 130 is inserted, causing variation of a position of the distal end part 131 of the fueling gun 130. Thus, fueling performance is deteriorated.

Figure 7:
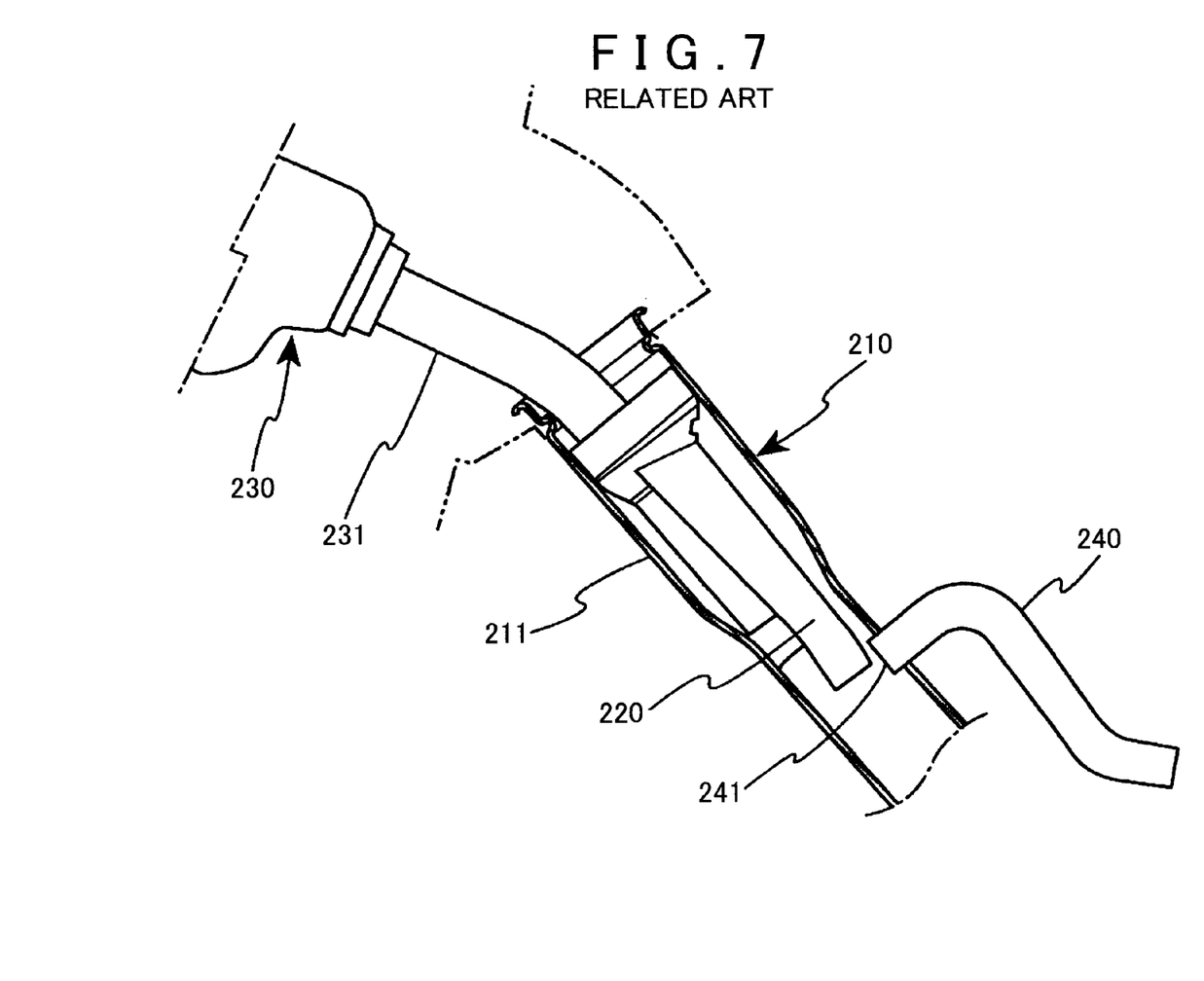
FIG. 7 is a sectional view of a part where a nozzle guide is mounted on an inlet part of another filler pipe according to a related art.

As shown in FIG. 7, a nozzle guide 220 in an inlet 211 of a filler pipe 210 is provided, and the nozzle guide 220 clamps a distal end part 231 of a fueling gun 230. At the same time, an opening 241 of a breather pipe 240 is provided in the vicinity of a distal end of the nozzle guide 220, thereby preventing air from being trapped in the middle of the filler pipe 210 (for example, see Japanese Patent Application Publication No. 2014-97693 (JP 22014-97693 A)).

However, it is difficult to ensure that the nozzle guide 220 holds the distal end part 231 of the fueling gun 230 with no wobble, and there is no structure for blocking fuel that returns from the opening 241 of the breather pipe 240. Therefore, there are instances where fuel spits back and spouts out from an oil filler port of a vehicle body.

Figure 8:
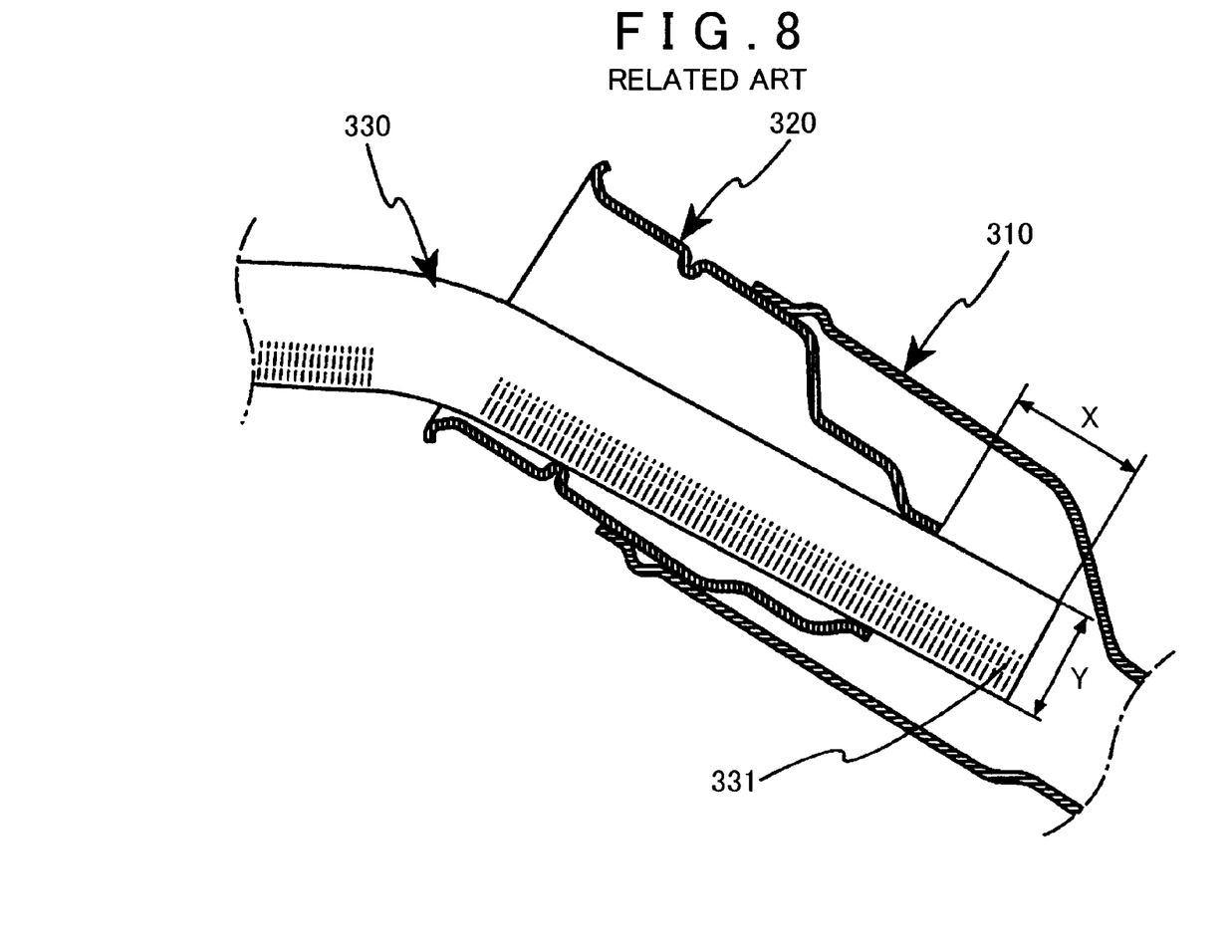
FIG. 8 is a sectional view of a part where a nozzle guide is mounted on an inlet part of yet another filter pipe according to a related art.

Further, as shown in FIG. 8, due to the foregoing regulations, in a filler pipe 310 for North America, a distance from a distal end of a nozzle guide 320 to a distal end part 331 of a fueling gun 330 (X in FIG. 8) needs to be 22.5 mm or longer. For Europe, any fueling gun 330 having the distal end part 331 with an outer diameter (Y in FIG. 8) of 23.6 mm or larger should not be inserted into the nozzle guide 320 in order to prevent misfueling.

Thus, the invention provides a filler pipe that stabilizes holding of a fueling gun, improves fueling performance, and prevents spit-back of fuel.

A filler pipe according to an aspect of the invention feeds fuel into a fuel tank from an oil filler port of a vehicle body, the oil filler port being formed on an outer surface of the vehicle body. The filler pipe includes a nozzle guide that is mounted on an inlet part of the filler pipe and is configured to hold a nozzle end part of a fueling gun. The nozzle guide includes a nozzle guide mounting part, which is mounted on the inlet part of the filler pipe, a nozzle guide holding part, which is positioned in a distal end of the nozzle guide, is configured to hold the nozzle end part of the fueling gun, and sends fuel into the filler pipe, and a nozzle guide connecting part that connects the nozzle guide mounting part and the nozzle guide holding part with each other. The nozzle guide holding part has a plurality of projecting parts that are able to abut on an outer surface of a nozzle of the fueling gun. The nozzle guide is mounted on the inlet part of the filler pipe, at the nozzle guide mounting part, by swaging or spot welding.

According to the above aspect, in the filler pipe that feeds fuel into the fuel tank from the oil filler port of the vehicle body, the oil filler port being formed on the outer surface of the vehicle body, the nozzle guide that holds the nozzle end part of the fueling gun is mounted on the inlet part of the filler pipe. Therefore, when inserting the fueling gun to the inlet part of the filler pipe, the metallic nozzle guide is able to guide and hold the nozzle end part of the fueling gun at a given position, thus ensuring that fuel is fed.

The nozzle guide includes the nozzle guide mounting part, which is mounted on the inlet part of the filler pipe, the nozzle guide holding part, which is positioned in the distal end of the nozzle guide, holds the nozzle end part of the fueling gun, and sends fuel into the filler pipe, and the nozzle guide connecting part that connects the nozzle guide mounting part and the nozzle guide holding part with each other.

Therefore, when the nozzle guide mounting part is mounted on the inlet part of the filler pipe, the nozzle guide connecting part holds the nozzle guide mounting part, and, at the same time, the nozzle guide holding part holds the nozzle end part of the fueling gun. Thus, a fuel injecting direction is fixed.

The plurality of projecting parts, which are able to abut on an outer surface of the nozzle end part of the fueling gun, are formed in the nozzle guide holding part. Therefore, the nozzle end part of the fueling gun is held by the projecting parts, thereby stabilizing the position of the nozzle end part. At the same time, the nozzle end part of the fueling gun having a given diameter or larger is restricted from entering. Thus, misfueling is prevented.

By treating the projecting parts of the nozzle guide as the distal end of the nozzle guide, it is possible to conform to the regulations in North America. Since the nozzle guide is mounted on the inlet part of the filler pipe, at the nozzle guide mounting part, by calking or spot welding, it is possible to fasten the nozzle guide to a given position inside the filler pipe by using simple equipment. Thus, it is possible to fix the nozzle end part of the fueling gun inside the filler pipe In the foregoing aspect, the nozzle guide may have no hole in a part that faces an opening of a breather pipe that is mounted on the inlet part of the filler pipe.

In the above structure, the nozzle guide connecting part with no hole is formed in the nozzle guide, in the part that faces the opening of the breather pipe mounted on the inlet part of the filler pipe. Therefore, fuel that flows back from the breather pipe to the inlet part of the filler pipe is blocked by an outer wall of the nozzle guide connecting part of the nozzle guide, and is thus prevented from spitting back to the oil filler port side from the distal end of the nozzle guide.

In the foregoing aspect, the plurality of projecting parts of the nozzle guide may be formed so that an interval between the projecting parts, which face each other, is between 22.6 and 23.6 mm.

In the above structure, the plurality of projecting parts of the nozzle guide are formed so that the interval between the projecting parts, which face each other, is between 22.6 and 23.6 mm. Therefore, only the nozzle end part of the fueling gun having a given dimension is inserted into the nozzle guide. Thus, it is possible to feed a given type of fuel, and prevent misfueling.

In the foregoing aspect, the nozzle guide connecting part may have an air bleeding hole.

In the above structure, since the air bleeding hole is formed in the nozzle guide connecting part, air flowing back from the breather pipe when fueling is released outside from the oil filler port, thereby realizing smooth and swift fueling.

In the foregoing aspect, a distal end of the nozzle guide holding part may have a nozzle guide stopper that is configured to hold a distal end of the nozzle end part of the fueling gun.

In the above structure, since the nozzle guide stopper, which holds the distal end of the nozzle end part of the fueling gun, is formed in the distal end of the nozzle guide holding part, the nozzle guide stopper is able to stop the nozzle end part of the fueling gun having a given diameter or larger from entering. Thus, the nozzle end part of the fueling gun does not enter the filler pipe beyond the nozzle guide by a given length or longer, thereby obtaining stable fueling performance.

In the foregoing aspect, the nozzle guide holding part may have a fuel bleeding hole.

In the above structure, since the fuel bleeding hole is formed in the nozzle guide holding part, fuel flowing backward from the fueling gun while fueling does not reach an auto-stop sensor. Therefore, when the tank is full, it is ensured that the auto-stop sensor is able to function by detecting fuel from the fuel bleeding hole, thereby preventing false detection.

In the foregoing aspect, a nozzle guide upper-side opening may be formed in an upper surface of the nozzle guide holding part.

In the above structure, since the nozzle guide upper-side opening is formed in the upper surface of the nozzle guide holding part, the upper surface of the nozzle guide holding part is open. Thus, not only the nozzle guide stopper is engaged with the distal end part of the fueling gun, but also the distal end part of the fueling gun is prevented from being caught by the nozzle guide holding part. Thus, the fueling gun is inserted and drawn out easily.

In the foregoing aspect, the nozzle guide mounting part may be mounted closely onto an inner surface of the inlet part of the filler pipe.

In this structure, the nozzle guide mounting part is mounted closely onto the inner surface of the inlet part of the filler pipe. Therefore, the nozzle guide is mounted on the inner surface of the filler pipe stably. It is thus ensured that the nozzle end part of the fueling gun is held at a given position, thereby realizing stable fueling.

In the foregoing aspect, the nozzle guide may be made from metal.

In the above structure, since the nozzle guide is made from metal, the nozzle guide has high rigidity, holds the nozzle end part of the fueling gun firmly, and is able to fix the nozzle end part of the fueling gun to a position that enables stable fueling.

In the nozzle guide mounting part, a plurality of projecting parts are formed, which are able to abut on the outer surface of the nozzle end part of the fueling gun. Therefore, the projecting parts hold the nozzle end part of the fueling gun, thereby stabilizing the position of the nozzle end part. Also, the projecting parts restrict entrance of the nozzle end part of the fueling gun having a given diameter or larger, thereby preventing misfueling. Since the nozzle guide is mounted on the inlet part of the filler pipe, at the nozzle guide mounting part, by swaging, the nozzle end part of the fueling gun is fixed inside the filler pipe easily.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The invention relates to a filler pipe 10 on which a nozzle guide 20 is mounted. The filler pipe 10 feeds fuel into an automobile fuel tank from an oil filler port of a vehicle body, which is provided in a vehicle body of an automobile. The filler pipe 10 is formed from a synthetic resin or metal. The nozzle guide 20 is mounted on an inlet part 12 of the filler pipe 10.

Figure 1:
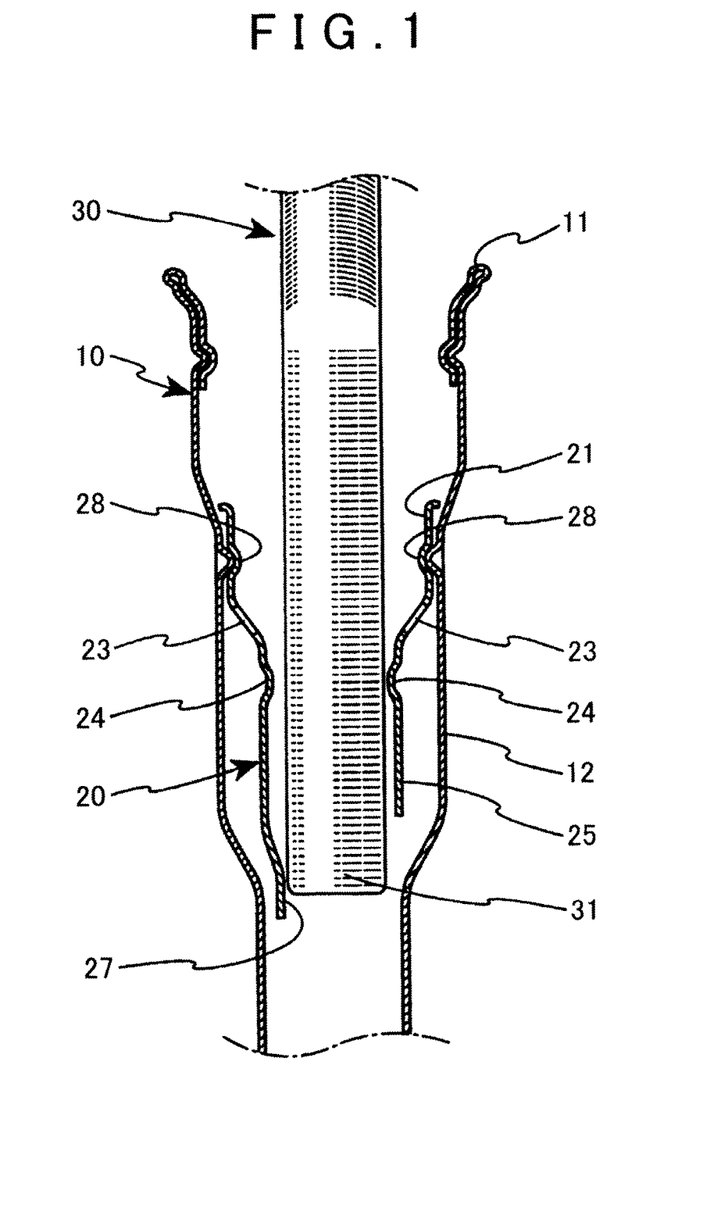
FIG. 1 shows an embodiment of the invention, and is a sectional view from an upper surface side, showing a part where a nozzle guide is mounted on an inlet part of a filler pipe, and a distal end part of a fueling gun is inserted.
Figure 2:
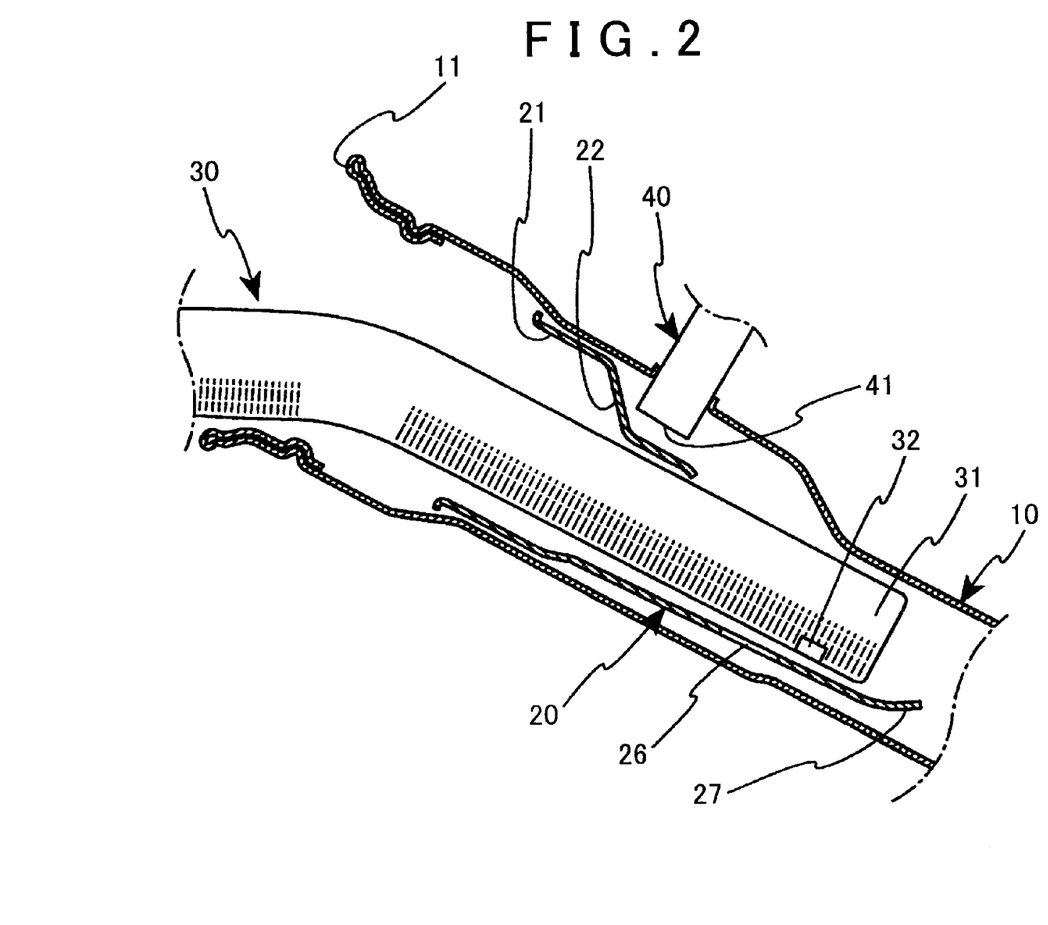
FIG. 2 is shows the embodiment of the invention, and is a sectional view seen from the side, showing a part where the nozzle guide is mounted on the inlet part of the filler pipe, and the distal end of the fueling gun is inserted.
Figure 3:
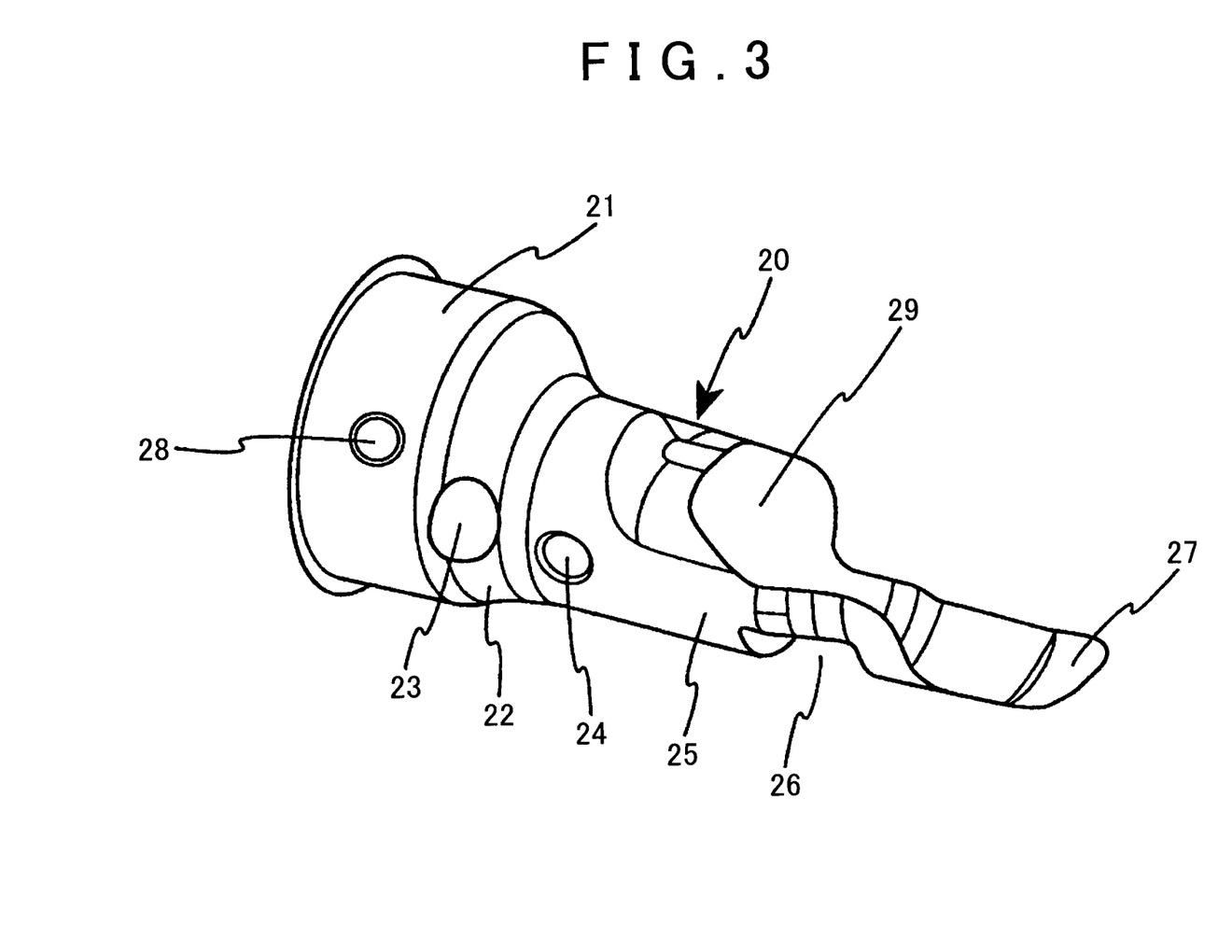
FIG. 3 shows the embodiment of the invention, and is a perspective view showing the nozzle guide obliquely from above.
Figure 4:
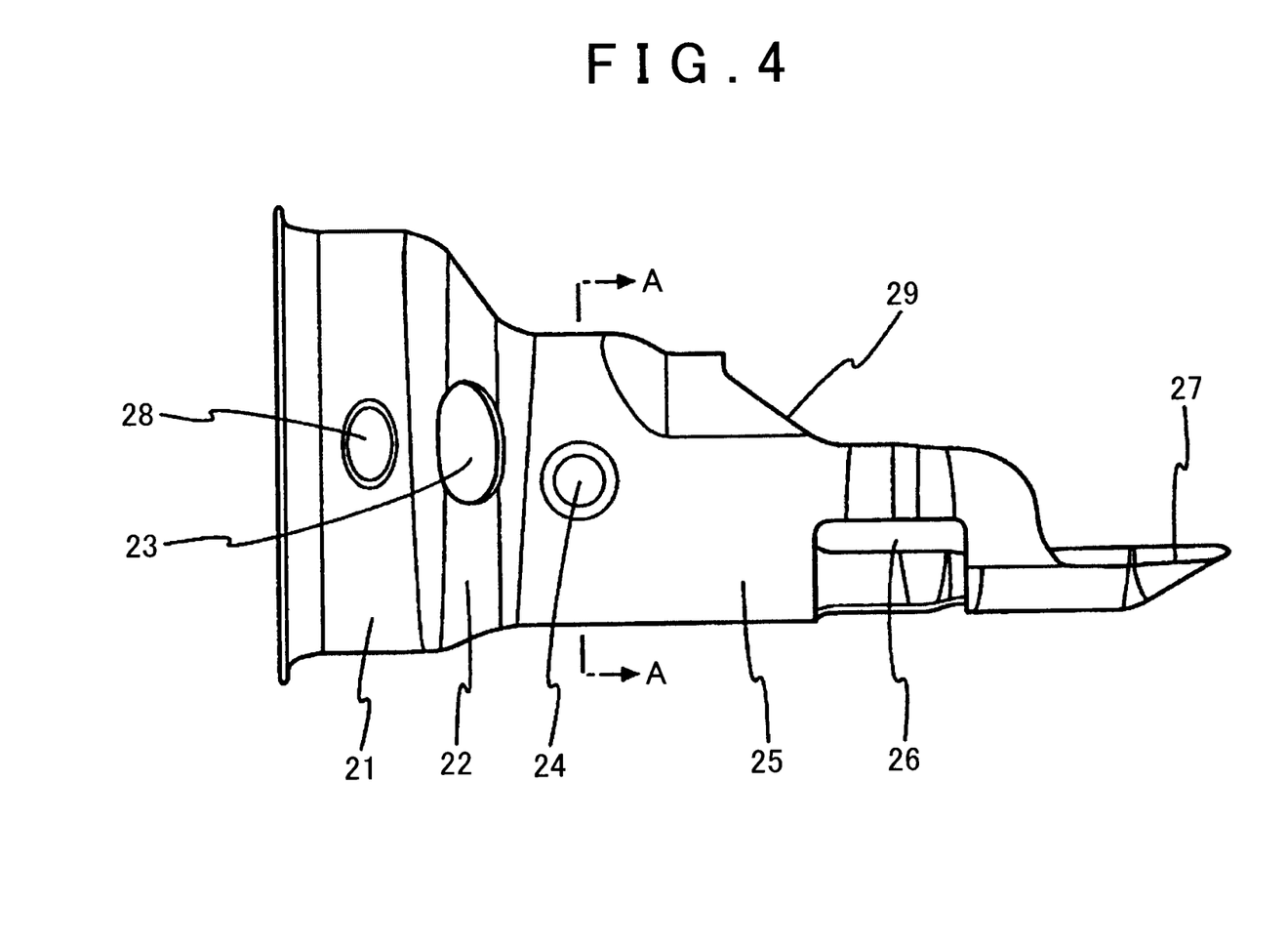
FIG. 4 shows the embodiment of the invention, and is a side view of the nozzle guide.

As shown in FIG. 1 and FIG. 2, the inlet part 12 is formed in a distal end part of the filler pipe 10. A portion deeper than the inlet part 12 is a body part of the filler pipe 10 and is connected with a fuel tank. An inlet 11, into which a fueling gun 30 is inserted, is formed on an opening side of the inlet part 12, and the inlet 11 is open on the oil filler port (not shown) of the vehicle body. The later-described nozzle guide 20 is mounted on the inlet part 12.

The inlet part 12 has a diameter expanded from the body part of the filler pipe 10 and is formed into a cylindrical shape. The later-described nozzle guide 20 is mounted on the inlet part 12. A distal end of a breather pipe 40 is mounted on the inlet part 12, and an opening 41 of the breather pipe 40 opens on an inner side of the inlet part 12.

The inlet 11 is formed by expanding the distal end of the inlet part 12 into a funnel shape, and a distal end part of the inlet 11 is two folded by folding back a distal end of the filler pipe 10. A threaded part is formed in the folded part in the distal end of the filler pipe 10, and a tank cap (not shown) is mounted on the threaded part. The threaded part may be not only formed in the two-folded part formed by folding back the distal end of the filler pipe 10, but also formed separately from the filler pipe 10 and mounted on the filler pipe 10.

Next, the nozzle guide 20 is explained with reference to FIG. 1 to FIG. 5. The nozzle guide 20 is formed from metal. Therefore, the nozzle guide 20 has high rigidity, is able to hold a nozzle end part 31 of the fueling gun 30 firmly, and fix the nozzle end part 31 of the fueling gun 30 at a position that enables stable fueling. Stainless steel, iron, and so on may be used as the metal.

A nozzle guide mounting part 21, which is formed into a cylindrical shape, is formed in a distal end of the nozzle guide 20 on the side of the inlet 11 of the filler pipe 10. Since the nozzle guide mounting part 21 is formed into the cylindrical shape, when the nozzle guide 20 is mounted on the inlet part 12 of the filler pipe 10, the nozzle guide mounting part 21 abuts on an inner surface of the inlet part 12 of the cylindrical filler pipe 10. Thus, the nozzle guide 20 is held stably.

Further, when the nozzle guide 20 is mounted on the inlet part 12 of the filler pipe 10, the nozzle guide 20 is mounted on the inlet part 12 of the filler pipe 10 by swaging at a nozzle guide calking part 28 of the nozzle guide mounting part 21. The nozzle guide 20 is fastened easily and firmly to a given position inside the inlet part 12 of the filler pipe 10 by swaging without large equipment. Therefore, when the nozzle end part 31 of the fueling gun 30 is inserted, the nozzle end part 31 is fixed inside the filler pipe 10.

A nozzle guide connecting part 22 is formed continuously from the nozzle guide mounting part 21. The nozzle guide connecting part 22 connects a nozzle guide holding part 25, which holds the nozzle end part 31 of the fueling gun 30, and the nozzle guide mounting part 21 with each other. The nozzle guide holding part 25 is described later. As shown in FIG. 2, the nozzle guide mounting part 21 has a diameter larger than that of the nozzle guide holding part 25. Therefore, the nozzle guide connecting part 22 is formed into a slope shape in order to connect the diameter difference.

An inclined surface of the nozzle guide connecting part 22 is formed on a side where the breather pipe 40 is mounted. A part of the nozzle guide connecting part 22, located on the other side of the part where the breather pipe 40 is mounted, is formed into a flat shape continuously from the nozzle guide mounting part 21. Therefore, the nozzle guide 20 is deformed so that the entire diameter of the nozzle guide 20 is reduced gradually because the diameter of the nozzle guide connecting part 22 becomes smaller gradually, while the rest of the parts of the nozzle guide 20 remains unchanged. Thus, when the fueling gun 30 is inserted, the distal end of the nozzle end part 31 of the fueling gun 30 is easily inserted by slipping on the slope of the nozzle guide connecting part 22.

As shown in FIG. 2, in the nozzle guide connecting part 22 and the nozzle guide holding part 25, an outer wall having no hole is extended in a part that faces the opening 41 of the breather pipe 40 mounted on the inlet part 12 of the filler pipe 10. Therefore, fuel that flows back to the inlet part 12 of the filler pipe 10 from the breather pipe 40 is blocked by the outer wall of the nozzle guide connecting part 22 and the nozzle guide holding part 25 of the nozzle guide 20 and is thus prevented from spitting back to the oil filler port side from the nozzle guide 20.

As shown in FIG. 1, nozzle guide air bleeding holes 23 are formed on both sides of the nozzle guide connecting part 22. The both sides are separated from the part that faces the opening 41 of the breather pipe 40, by about 90 degrees. Since the nozzle guide air bleeding holes 23 are formed, air that flows back from the breather pipe 40 when fueling passes along the outer wall of the nozzle guide connecting part 22, passes through the nozzle guide air bleeding holes 23, and is released outside from the inlet 11 of the filler pipe 10 and the oil filler port of the vehicle body. Thus, smooth and swift fueling is realized.

The nozzle guide holding part 25, having a diameter smaller than that of the nozzle guide mounting part 21, is formed in the distal end of the nozzle guide 20 continuously from the nozzle guide connecting part 22. It is preferred that the nozzle guide holding part 25 is formed so as to have an inner diameter that is slightly larger than an outer diameter of the nozzle end part 31 of the fueling gun 30.

In this case, because of the nozzle guide holding part 25, together with a later-described nozzle guide locating part 24, the nozzle end part 31 of the fueling gun 30 is inserted easily. At the same time, a gap between the nozzle end part 31 of the fueling gun 30 and the nozzle guide holding part 25 is reduced. Therefore, it is possible to ensure that the nozzle guide holding part 25 holds the nozzle end part 31 of the fueling gun 30 with no wobble, thereby maintaining a fuel injecting direction to a given direction.

Figure 5:
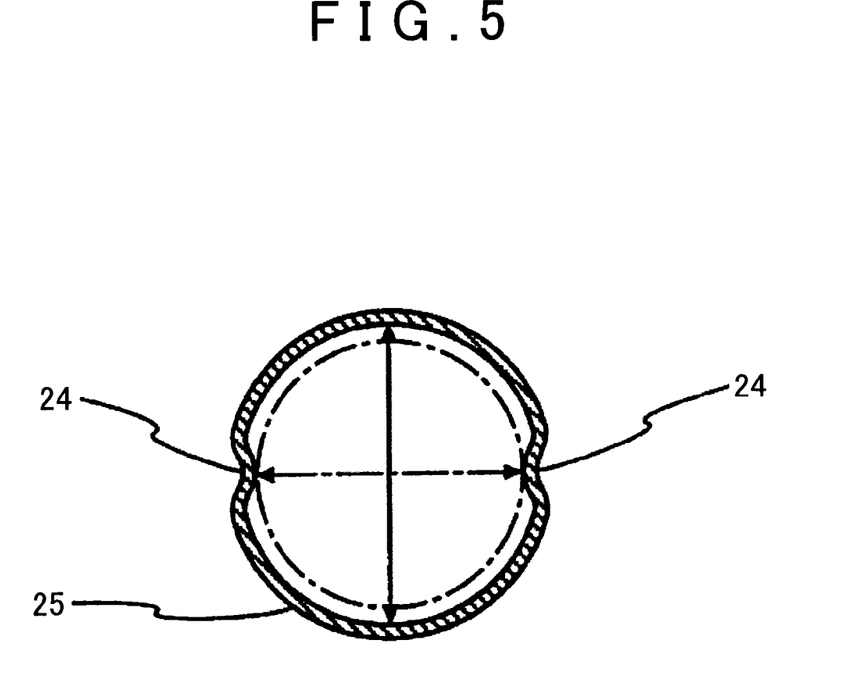
FIG. 5 shows the embodiment of the invention, and is a sectional view of the nozzle guide, taken along the line A-A in FIG. 4.

As shown in FIG. 1 and FIG. 5, a plurality of nozzle guide locating parts 24 are formed in the nozzle guide holding part 25. The nozzle guide locating parts 24 are projecting parts that are able to abut on an outer surface of the nozzle end part 31 of the fueling gun 30. In this embodiment, two nozzle guide locating parts 24 are formed in parts of the nozzle guide holding part 25, on both opposing sides near the nozzle guide connecting part 22, so as to hold the nozzle end part 31 of the fueling gun 30 from both side surfaces. By treating the nozzle guide locating parts 24 as the distal end of the nozzle guide 20, the nozzle end part 31 of the fueling gun 30 projects from the nozzle guide 20 by 22.5 mm or longer, which satisfies the regulations in North America.

Therefore, when the fueling gun 30 is inserted into the nozzle guide 20, the nozzle guide locating parts 24 hold the nozzle end part 31 of the fueling gun 30, and stabilizes the position of the nozzle end part 31. At the same time, the nozzle guide locating parts 24 prevents insertion of the nozzle end part 31 of the fueling gun 30 having a given diameter or larger, thereby preventing misfueling. In this embodiment, an interval between the distal ends of the nozzle guide locating parts 24 formed on both sides of the nozzle guide holding part 25 is 22.6 mm. Three or more nozzle guide locating parts 24 may be formed.

It is preferred that the interval between the nozzle guide locating part 24 and the nozzle guide locating part 24, which face each other, is between 22.6 and 23.6 mm. In this case, only the nozzle end part 31 of the given fueling gun 30 is able to pass through between the nozzle guide locating part 24 and the nozzle guide locating part 24, which face each other. Thus, for example, only gasoline, or a given type of fuel is fed, thereby preventing misfueling.

A nozzle guide upper-side opening 29 is formed in an upper surface of the nozzle guide holding part 25. Since the nozzle guide upper-side opening 29 is formed, the upper surface of the nozzle guide holding part 25 is open. Therefore, a later-described nozzle guide stopper 27 is engaged with the nozzle end part 31 of the fueling gun 30, and, at the same time, the nozzle end part 31 of the fueling gun 30 is prevented from being clamped by the nozzle guide holding part 25. Thus, the fueling gun 30 is inserted and drawn out easily.

The nozzle guide stopper 27 is formed in the distal end side of the nozzle guide holding part 25. The nozzle guide stopper 27 holds the distal end of the nozzle end part 31 of the fueling gun 30. The nozzle guide stopper 27 is able to stop the nozzle end part 31 of the fueling gun 30 from entering more deeply from a given position in the distal end of the nozzle guide holding part 25, and the nozzle end part 31 of the fueling gun 30 does not enter the filler pipe 10 beyond the nozzle guide 20 by a given length or longer. Therefore, stable fueling is performed.

As shown in FIG. 2, a nozzle guide fuel bleeding hole 26 is formed in a part of the distal end side of the nozzle guide holding part 25 of the nozzle guide 20. This part corresponds to an auto-stop sensor 32 mounted on the nozzle end part 31 of the fueling gun 30. Therefore, while fueling with the fueling gun 30, fuel flowing backward from the breather pipe 40 does not cause malfunction of the auto-stop sensor 32. Therefore, when the tank is full, it is ensured that the auto-stop sensor 32 is able to function by detecting fuel from the fuel bleeding hole 26, thereby preventing false detection.

What is claimed is:

1. A filler pipe that feeds fuel into a fuel tank from an oil filler port of a vehicle body, the oil filler port being formed on an outer surface of the vehicle body, comprising
    a nozzle guide that is mounted on an inlet part of the filler pipe and is configured to hold a nozzle end part of a fueling gun, wherein
    the nozzle guide includes a nozzle guide mounting part, which is mounted on the inlet part of the filler pipe, a nozzle guide holding part, which is positioned in a distal end of the nozzle guide, is configured to hold the nozzle end part of the fueling gun, and sends fuel into the filler pipe, and a nozzle guide connecting part that connects the nozzle guide mounting part and the nozzle guide holding part with each other,
    the nozzle guide is provided such that the nozzle guide mounting part, the nozzle guide connecting part, and the nozzle guide holding part are integrally provided,
    the nozzle guide holding part has a plurality of projecting parts that are able to abut on an outer surface of a nozzle of the fueling gun,
    the nozzle guide is mounted on the inlet part of the filler pipe, at the nozzle guide mounting part, by swaging or spot welding,
    the nozzle guide has no hole in a part that faces an opening of a breather pipe that is mounted on the inlet part of the filler pipe, and
    the nozzle guide holding part includes a nozzle guide stopper configured as a curved distal end of the nozzle guide holding part, the nozzle guide stopper is curved in a direction of a central axis of the nozzle guide and holds a distal end of the nozzle end part of the fueling gun.

2. The filler pipe according to claim 1, wherein the plurality of projecting parts of the nozzle guide are formed so that an interval between the projecting parts, which face each other, is between 22.6 and 23.6 mm.

3. The filler pipe according to claim 1, wherein
the nozzle guide connecting part has an air bleeding hole.

4. The filler pipe according to claim 1, wherein
the nozzle guide holding part has a fuel bleeding hole.

5. The filler pipe according to claim 1, wherein
a nozzle guide upper-side opening is formed in an upper surface of the nozzle guide holding part.

6. The filler pipe according to claim 1, wherein
the nozzle guide mounting part is mounted closely onto an inner surface of the inlet part of the filler pipe.

7. The filler pipe according to claim 1, wherein
the nozzle guide is made from metal.

\* \* \* \* \*